United States Patent
Bleile et al.

(10) Patent No.: US 9,501,612 B2
(45) Date of Patent: Nov. 22, 2016

(54) ERROR CAUSE DETECTION OR NARROWING DOWN OF ERRORS WITH THE AID OF ERROR PATTERNS IN THE AIR SYSTEM

(75) Inventors: Thomas Bleile, Stuttgart (DE); Stefan Michael, Markgroeningen (DE); Andras Montvay, Markgroeningen (DE); Christina Hoepfner, Bergen (DE); Marc Ringeisen, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 989 days.

(21) Appl. No.: 13/609,921

(22) Filed: Sep. 11, 2012

(65) Prior Publication Data
US 2013/0080020 A1 Mar. 28, 2013

(30) Foreign Application Priority Data
Sep. 28, 2011 (DE) .......................... 10 2011 083 587

(51) Int. Cl.
| | |
|---|---|
| *G01M 15/04* | (2006.01) |
| *G06F 19/00* | (2011.01) |
| *F02D 28/00* | (2006.01) |
| *F02D 41/22* | (2006.01) |
| *F02D 41/26* | (2006.01) |
| *F02D 41/00* | (2006.01) |

(52) U.S. Cl.
CPC .............. *G06F 19/00* (2013.01); *F02D 28/00* (2013.01); *F02D 41/22* (2013.01); *F02D 41/26* (2013.01); *G06F 19/328* (2013.01); *F02D 41/0072* (2013.01); *F02D 2200/0402* (2013.01); *F02D 2200/0406* (2013.01); *F02D 2200/0411* (2013.01); *G01M 15/042* (2013.01)

(58) Field of Classification Search
CPC ......................... F02D 2200/0411; G01M 15/04
USPC ................ 73/114.31, 114.32, 114.33, 114.34
See application file for complete search history.

(56) References Cited

U.S. PATENT DOCUMENTS

| | | | | |
|---|---|---|---|---|
| 4,424,709 | A * | 1/1984 | Meier et al. ................ | 73/114.25 |
| 4,931,940 | A * | 6/1990 | Ogawa et al. ................. | 701/101 |
| 5,201,292 | A * | 4/1993 | Grajski et al. ........... | 123/406.38 |
| 5,689,067 | A * | 11/1997 | Klein et al. ................. | 73/114.79 |
| 7,275,426 | B2* | 10/2007 | Lahti ....................... | F02D 37/02 |
| | | | | 73/114.32 |
| 2006/0218998 | A1* | 10/2006 | Machida et al. ............. | 73/117.3 |
| 2008/0245142 | A1* | 10/2008 | Bowling et al. ........... | 73/114.26 |
| 2009/0049897 | A1* | 2/2009 | Olin ....................... | F02D 41/185 |
| | | | | 73/114.32 |

(Continued)

*Primary Examiner* — Eric S McCall
(74) *Attorney, Agent, or Firm* — Norton Rose Fulbright US LLP; Gerard Messina

(57) ABSTRACT

A method for monitoring at least one part of an internal combustion engine based on a variable whose values characterize the operation of the part of the internal combustion engine during different states of the internal combustion engine, including: determining an actual pattern with the actual values of the variable during different states of the internal combustion engine which describe the actual operation of the internal combustion engine; providing a reference pattern for a known operation of the internal combustion engine, the reference pattern including reference values of the variable for different states of the internal combustion engine; and comparing the actual pattern to the reference pattern to determine a similarity between the actual operation and the known operation.

7 Claims, 4 Drawing Sheets

(56) References Cited

U.S. PATENT DOCUMENTS

| | | | |
|---|---|---|---|
| 2009/0139317 A1* | 6/2009 | Deivasigamani | F01P 11/18 73/114.31 |
| 2009/0205413 A1* | 8/2009 | Yamauchi et al. | 73/114.41 |
| 2010/0031738 A1* | 2/2010 | Feldkamp et al. | 73/114.79 |
| 2010/0051000 A1* | 3/2010 | Kress et al. | 123/568.11 |
| 2010/0286960 A1* | 11/2010 | Ringeisen | 702/183 |
| 2013/0060445 A1* | 3/2013 | Bleile et al. | 701/101 |

* cited by examiner

ERROR CAUSE DETECTION OR NARROWING DOWN OF ERRORS WITH THE AID OF ERROR PATTERNS IN THE AIR SYSTEM

RELATED APPLICATION INFORMATION

The present application claims priority to and the benefit of German patent application no. 10 2011 083 587.3, which was filed in Germany on Sep. 28, 2011, the disclosure of which is incorporated herein by reference.

FIELD OF THE INVENTION

The present invention relates to error detection in internal combustion engines.

BACKGROUND INFORMATION

On board diagnostic systems are known from the automotive technology. These systems are vehicle diagnostic systems which monitor all emission-influencing systems during the operation and store possibly arising errors in a memory so that they may be queried and, if necessary, eliminated.

Common monitoring functions in the air system for internal combustion engines are in most cases configured in such a way that a characteristic (for example, system deviation) is determined from inputs (sensors, model values, . . . ) under certain release conditions used to establish an operating range. For this purpose, the air system must either be transferred into the established operating range or the monitoring functions must wait until the air system is transferred on its own into the established operating range. As soon as the air system is transferred into this established operating range, the characteristic is compared to the boundaries and an error is detected in the case of (permanent) exceedance of the boundaries.

Such common monitoring functions, however, monitor the air system only for their correct function and detect a malfunction per se. If a malfunction of the air system is determined, such common monitoring functions are presently not capable of qualifying this error. This makes the error diagnosis and the error cause investigation more difficult. Furthermore, it is possible that such common monitoring functions do not detect some of the errors at all. These are, in particular, those errors which do not result in any malfunctions of the internal combustion engine in the established operating range. This may be a soot clot, for example, which has settled in a valve and holds the valve open permanently. If the established operating range for the error diagnosis includes the valve in an open position, it is not possible to detect this error.

One possibility would be to monitor the air system over time. This is, however, complicated since a large amount of memory space is needed to store and evaluate the monitored signals. The evaluation itself is only marginally efficient since the air system greatly changes over time, resulting in errors being detectable only with great difficulties or not at all.

SUMMARY OF THE INVENTION

It is therefore an object of the exemplary embodiments and/or exemplary methods of the present invention to provide a method for monitoring at least one part of an internal combustion engine with the aid of an efficient error monitoring which makes an error cause investigation possible and uses only few resources.

The object may be achieved by the features of the systems and/or methods described herein.

Additional advantageous embodiments are described in the further descriptions herein.

According to a first aspect of the exemplary embodiments and/or exemplary methods of the present invention, a method for monitoring at least one part of an internal combustion engine based on a variable whose values characterize the operation of the part of the internal combustion engine during different states of the internal combustion engine includes the following steps:

determining an actual pattern with the aid of actual values of the variable during different states of the internal combustion engine which describe the actual operation of the internal combustion engine;

providing a reference pattern for a known operation of the internal combustion engine, the reference pattern including reference values of the variable for different states of the internal combustion engine; and comparing the actual pattern to the reference pattern to determine a similarity between the actual operation and the known operation.

The above-mentioned method has the advantage that, compared to the conventional methods for error monitoring in an internal combustion engine, it makes it possible to determine an error cause or at least to narrow it down, while keeping additional technical complexity for the implementation of the method according to the present invention within limits. The method according to the present invention is based on the idea that conventional monitoring functions check a characteristic only one-dimensionally within a certain operating range, e.g., with regard to its amplitude, thus making it almost impossible to qualify the error. With the aid of the above-mentioned method, the characteristic to be monitored is detected two-dimensionally as a pattern via its amplitude as well as as a function of the operating state, and may thus be compared to different reference patterns for different error causes.

Even if it is not possible to exactly assign the measured pattern to a reference pattern and thus to a known error cause, due to a similarity between the measured pattern and the known error pattern, a statement may be made with regard to what errors may be considered as causes for the malfunction of the internal combustion engine. This narrowing down of error causes saves the technician time during the repair of the internal combustion engine. The method according to the present invention is implementable with little memory space since, in contrast to recording the operating behavior of the internal combustion engine over time during a certain operating state, characteristic measurements which were carried out twice do not have to be stored twice. This reduces the number of the necessary measurements to be stored and processed and reduces the technical complexity to a minimum with regard to practical implementation of the method according to the present invention.

According to another aspect of the exemplary embodiments and/or exemplary methods of the present invention, a device for monitoring at least one part of an internal combustion engine based on a variable whose values characterize the operation of the part of the internal combustion engine during different states of the internal combustion engine includes the following characteristics:

an observation device for outputting an actual pattern with the aid of actual values, detected by the observation device, of the variable during different states of the internal combustion engine which describe the actual operation of the internal combustion engine;

a memory which is designed to store a reference pattern for a known operation of the internal combustion engine, the reference pattern including reference values of the variable for different states of the internal combustion engine; and an evaluation device which is designed to compare the actual pattern to the reference pattern in order to determine a similarity between the actual operation and the known operation.

In one embodiment of the present invention, the observation device may include the following characteristics in the method according to the present invention or in the device according to the present invention:

a sensor for detecting a measured variable as a function of the state of the internal combustion engine;

a modeling unit for outputting a model variable of the internal combustion engine; and an arithmetic unit for calculating the actual values of the variable based on the model variable and the measured variable.

By calculating the variable from model variables and measured variables, it is possible to select, for the characteristic to be monitored, an easily understandable and comprehensible variable whose values are easily interpretable and understandable to a technician during the repair of the internal combustion engine so that these values may provide other important information regarding a quick narrowing down of the error cause.

In one refinement of the exemplary embodiments and/or exemplary methods of the present invention, the observation device for assigning the actual values to the corresponding operating states in the actual pattern and the evaluation device for comparing the actual pattern to the reference pattern may be provided in the method according to the present invention or in the device according to the present invention when the actual values present in the actual pattern exceed a minimum. By taking into consideration the actual pattern starting from a certain number of measured actual values, it is possible to significantly increase the information content of the actual pattern, since the detected pattern only contains enough information for a reliable error diagnosis starting from a certain size. If the individual actual values of the actual pattern are additionally stored in a table, it is not only possible to avoid storing actual values for one single operating state twice, thus delimiting the memory space needed to establish the actual pattern to a minimum, but also to determine in a simple manner which operating state has not yet been assigned an actual value.

In another embodiment of the present invention, the reference pattern in the method according to the present invention or in the device according to the present invention may be a standard pattern whose reference values indicate the error-free operation of the internal combustion engine. In this way, the error-free operation of the internal combustion engine may be incorporated into the error cause detection.

In an additional refinement of the exemplary embodiments and/or exemplary methods of the present invention, the reference pattern in the method according to the present invention or in the device according to the present invention may be an error pattern whose reference values indicate the operation of the internal combustion engine at a known error.

In another embodiment of the exemplary embodiments and/or exemplary methods of the present invention, in the method according to the present invention or in the device according to the present invention, a standard pattern having reference values during the error-free operation of the internal combustion engine may be stored in the memory as a reference pattern and at least one reference pattern having reference values during the operation of the internal combustion engine at a known error may be stored in the memory, and the evaluation device may be provided for determining the distances between the actual pattern and the individual reference patterns and for outputting an error when the distance is smaller to the error pattern than to the standard pattern. By comparing the distances to the standard pattern and to the error pattern, tolerances in the monitoring function may be considered which do not allow an error to be output until a certain degree is reached.

In another refinement of the exemplary embodiments and/or exemplary methods of the present invention, in the method according to the present invention or in the device according to the present invention the comparison unit may be provided for transferring the internal combustion engine into the operating states for which actual values for the actual pattern are not yet available. In this way, the detected pattern may be expanded until a reliable error measurement may be ensured with the aid of the monitoring function according to the present invention.

According to another aspect of the exemplary embodiments and/or exemplary methods of the present invention, an air system for supplying a combustion engine of an internal combustion engine with gas for a combustion cycle of the combustion engine includes a device according to the present invention for monitoring the air system based on a variable whose values characterize the operation of the air system during different states of the internal combustion engine. The gas may be fresh air to which exhaust gas has additionally been added.

In one refinement of the exemplary embodiments and/or exemplary methods of the present invention, the variable may be a volumetric efficiency factor which indicates how much gas is taken in by a combustion engine of the internal combustion engine during a combustion cycle in relation to a theoretically possible gas intake volume. Since the volumetric efficiency factor is already made available by the filling control in the internal combustion engine, the time constant at which the volumetric efficiency factor is present essentially corresponds to the time constant of the filling control. Therefore, the monitoring function is particularly fast.

In the following, specific embodiments of the present invention are elucidated in greater detail with reference to the appended drawings.

DETAILED DESCRIPTION

Figure 1:
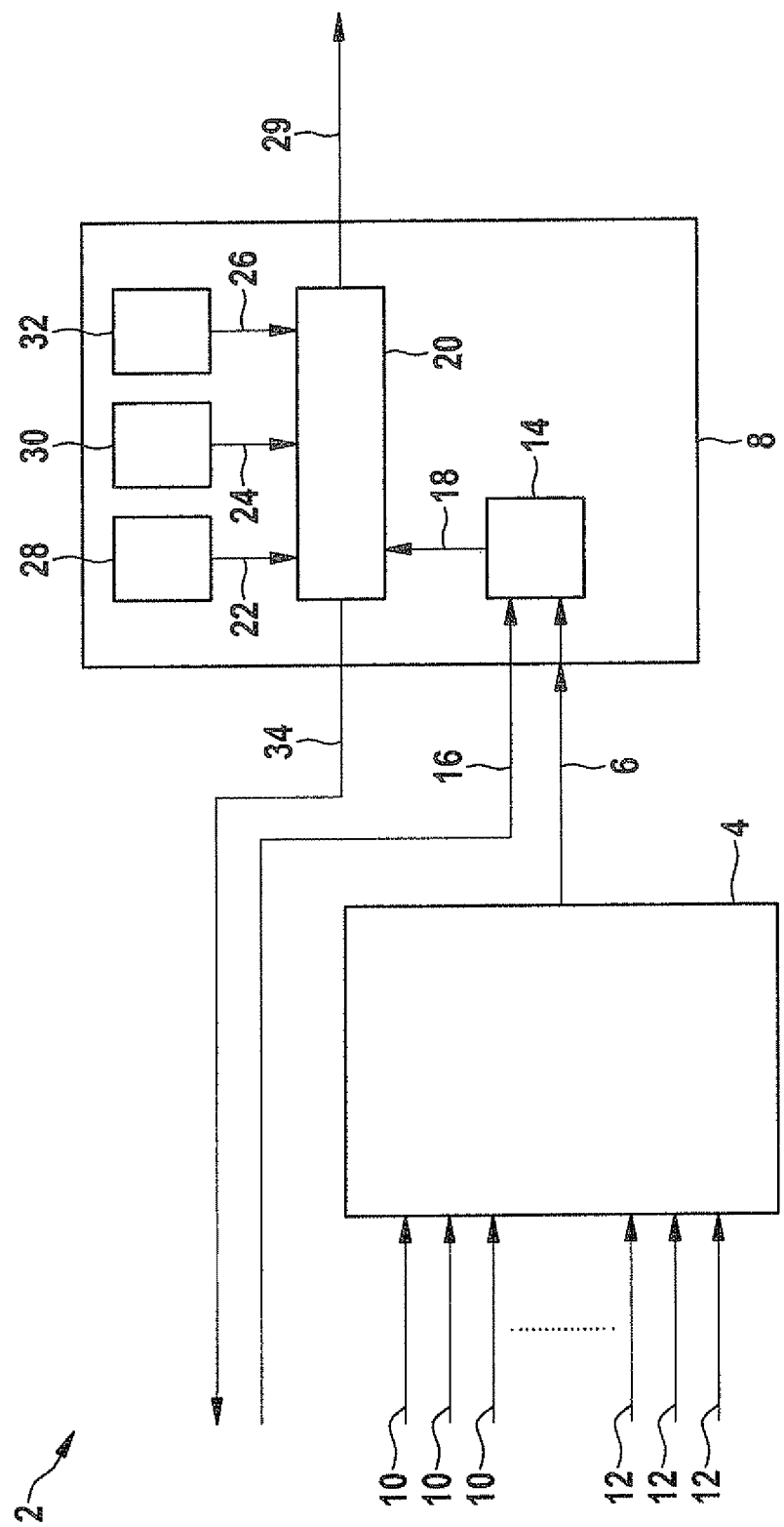
FIG. 1 shows a block diagram of a monitoring function in a device according to the present invention.

FIG. 1 shows the block diagram of a monitoring function 2 of a device according to the present invention. Monitoring function 2 is implementable in an arithmetic unit (not shown). In a vehicle, such an arithmetic unit is provided by the engine control unit, for example, which may thus also execute monitoring function 2.

Monitoring function 2 includes a model 4 and an evaluation device 8. Based on the values of different measured variables 10 and model variables 12, model 4 calculates a monitoring variable 6 which is made available to the comparison section. The values of measured variables 10 are delivered by sensors (not shown) in an internal combustion engine (not shown). Model variables 12 describe boundary conditions using which the at least one part of the internal combustion engine, such as air system 46 of the internal combustion engine which is explained later with reference to FIG. 4, may be simulated.

The exemplary embodiments and/or exemplary methods of the present invention are described below in a non-limiting manner based on a monitoring of air system 46 of the internal combustion engine. To clearly illustrate the exemplary embodiments and/or exemplary methods of the present invention, volumetric efficiency factor 6, which indicates how much gas is taken in by a combustion engine of the internal combustion engine during a combustion cycle in relation to a theoretically possible gas intake volume, is chosen as monitoring variable 6, as an example.

In evaluation device 8, volumetric efficiency factor 6 is supplied to an assignment unit 14. Assignment unit 14 assigns an operating state 16 of the air system of the internal combustion engine to received volumetric efficiency factor 6 and stores this assignment in a table (not shown). Operating state 16 may be deduced from different characteristics of the air system. For example, the air system may be transferred into a spatial illustration of the state known to those skilled in the art from which operating state 16 needed for the assignment may be obtained. Alternatively, operating state 16 may be deduced from certain elements of the air system. For example, the opening degree of the throttle valve for the gas supply may be used as operating state 16.

From the assignment of volumetric efficiency factor 6 to operating state 16 during different operating states 16, a pattern 18 results in assignment unit 14, the pattern representing the actual behavior of air system 46 of the internal combustion engine. Therefore, this pattern is referred to in the following as actual pattern 18. Actual pattern 18, thus represents a characteristics line from which a volumetric efficiency factor 6 may be unambiguously obtained for each operating state 16 of air system 46.

Actual pattern 18 is output to a comparison unit 20 which compares actual pattern 18 to at least one reference pattern 22 and determines the degree of similarity between this reference pattern 22 and actual pattern 18. Reference pattern 22 may show the behavior of air system 46 during error-free operation or the behavior of air system 46 during the operation at a known error. The exact determination of the similarity between reference pattern 22 and actual pattern 18 will be discussed later in this application.

In the following, it is assumed that reference pattern 22 represents the behavior of air system 46 during error-free operation, and is thus referred to as standard pattern 22. Furthermore, two additional reference patterns 24, 26 which identify the behavior of air system 46 at a first known error and a second known error, respectively, are supplied to comparison unit 20. Accordingly, the two additional reference patterns 24, 26 are referred to as first error pattern 24 and second error pattern 26.

Standard pattern 22 as well as first and second error patterns 24, 26 are accordingly stored in a first, second, and third memory area 28, 30, 32 in evaluation device 8.

The result of the comparison, and thus the specification of whether and due to what error the air system malfunctions, may eventually be made available in an output signal 29.

Comparison unit 20 may also output a control signal 34 to air system 46, using which air system 46 may be forced into a predetermined operating state in order to complete actual pattern 18, if necessary. This will be discussed in detail later in this application.

Figure 2:
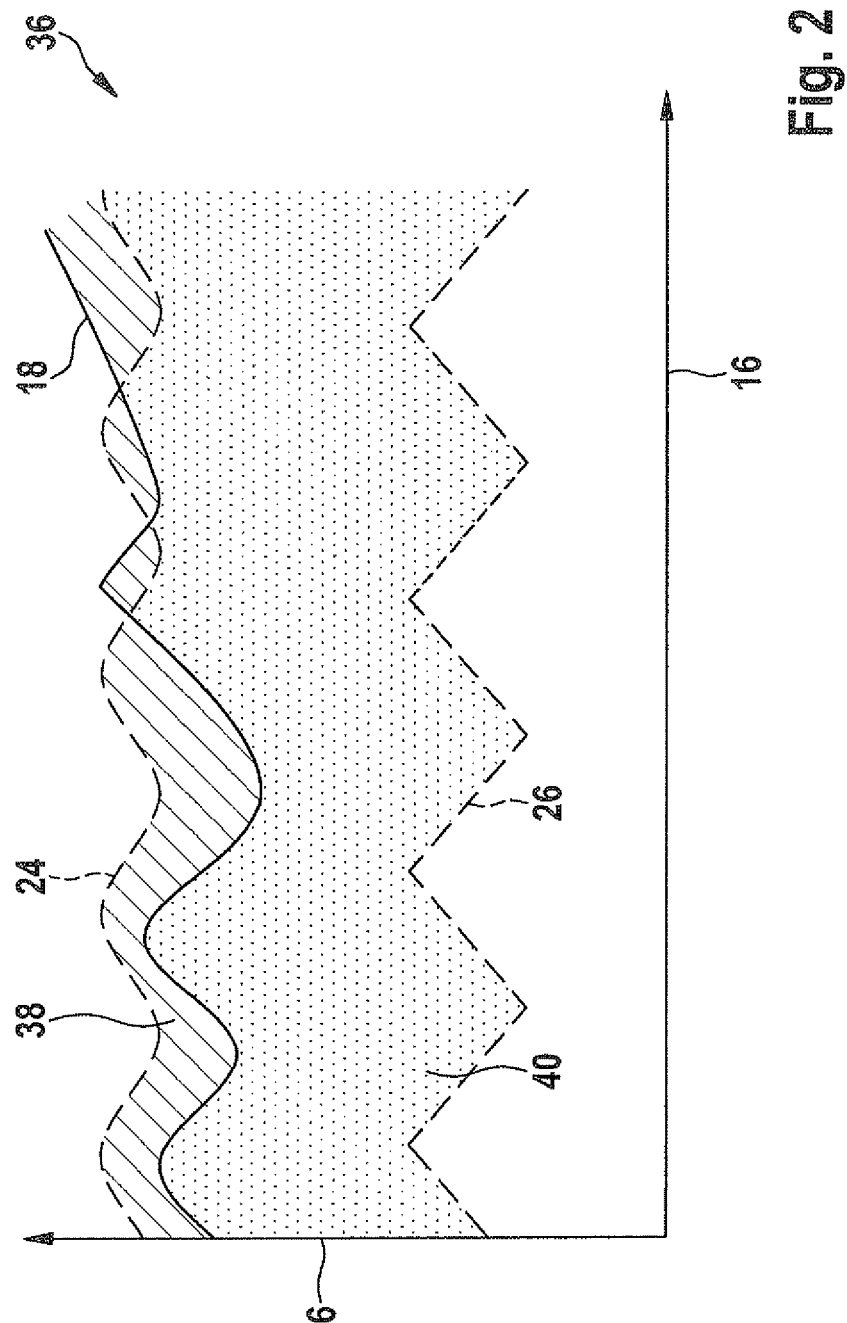
FIG. 2 shows a first diagram to illustrate the monitoring function according to the present invention from FIG. 1.

Reference is made to FIG. 2 which shows a first diagram 36 to illustrate monitoring function 2 according to the present invention.

In the diagram, volumetric efficiency factor 6 is plotted qualitatively against operating state 16. In first diagram 36, actual pattern 18 is illustrated qualitatively using a solid line. First error pattern 24 and second error pattern 26 are each identified by dashed lines in first diagram 36.

In this first diagram 36, comparison unit 20 may determine a first difference area 38 which is determined from the areas below actual pattern 18 minus the area below first error pattern 24. In the same manner, comparison unit 20 may determine a second difference area 40 which is determined from the areas below actual pattern 18 minus the area below second error pattern 26. Difference area 38, 40 having the smallest absolute value indicates that its corresponding reference pattern 24, 26 is most similar to actual pattern 18. In output signal 29, corresponding reference pattern 24, 26 or corresponding information may be output regarding reference pattern 24, 26 which has been assigned as being most similar to actual pattern 18.

Figure 3:
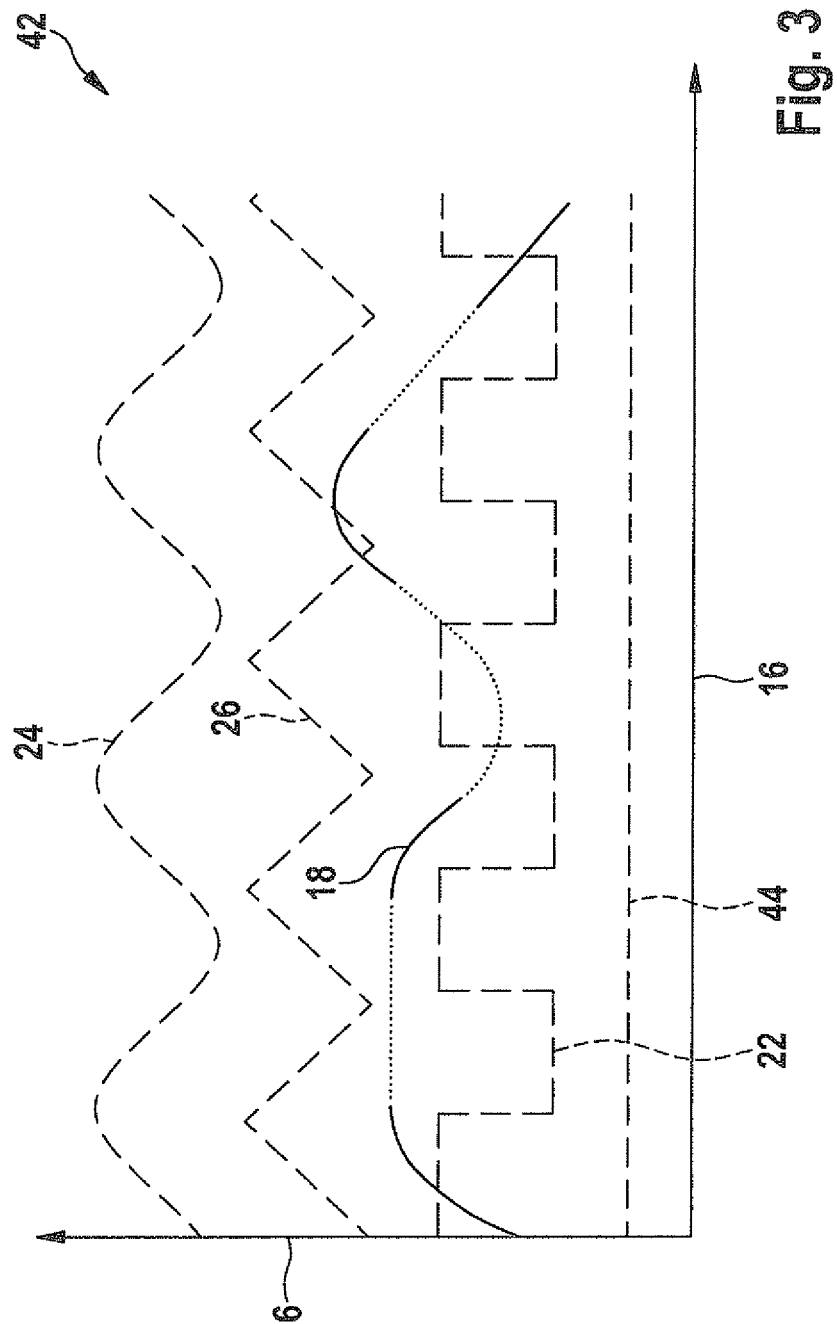
FIG. 3 shows a second diagram to illustrate the monitoring function according to the present invention from FIG. 1.

Reference is made to FIG. 3 which shows a second diagram 42 to illustrate monitoring function 2 according to the present invention. Similarly to first diagram 36, volumetric efficiency 6 is plotted against operating state 16.

Second diagram 42 additionally shows standard pattern 22 and a third error pattern 44 (not shown in FIG. 1). Moreover, second diagram 42 shows an incomplete actual pattern 18. As is easily apparent in second diagram 42, it is not clearly attributable from incomplete actual pattern 18 whether actual pattern 18 is more similar to standard pattern 22 or second error pattern 26.

The dotted lines between the solid lines of actual pattern 18 indicate what the shape of actual pattern 18 which has not yet been measured might look like. For completion, the shape could be interpolated in comparison unit 20, whereby the missing information is available in real-time and without further interventions into air system 46. If, however, the missing areas in actual pattern 18 are too large, there is the risk of the interpolation result being too inaccurate and inconclusive. To avoid this, it is possible, as shown in FIG. 1, to transfer air system 46 into missing operating states 16 with the aid of a control signal 34 from monitoring function 2 in order to complete actual pattern 18 insofar that a reliable statement with regard to the behavior of air system 46 may be made based on a comparison to standard pattern 22 and error patterns 24, 26, 44.

Similarly to FIG. 2, the difference areas with regard to individual reference patterns 22, 24, 26, 44 may also be determined for actual pattern 18 in FIG. 3. In one embodiment, a threshold value, which determines starting from which size a difference area is interpreted as an error in air system 46, may also be stored in comparison unit 20. In this case, comparison unit 20 may output in output signal 29 all error patterns 24, 26, 44 whose difference areas with actual pattern 18 fall below the threshold value. Thus, in the case of an erroneous operation of the air system, more likely error causes may be separated from the less likely error causes to narrow down the error cause.

Figure 4:
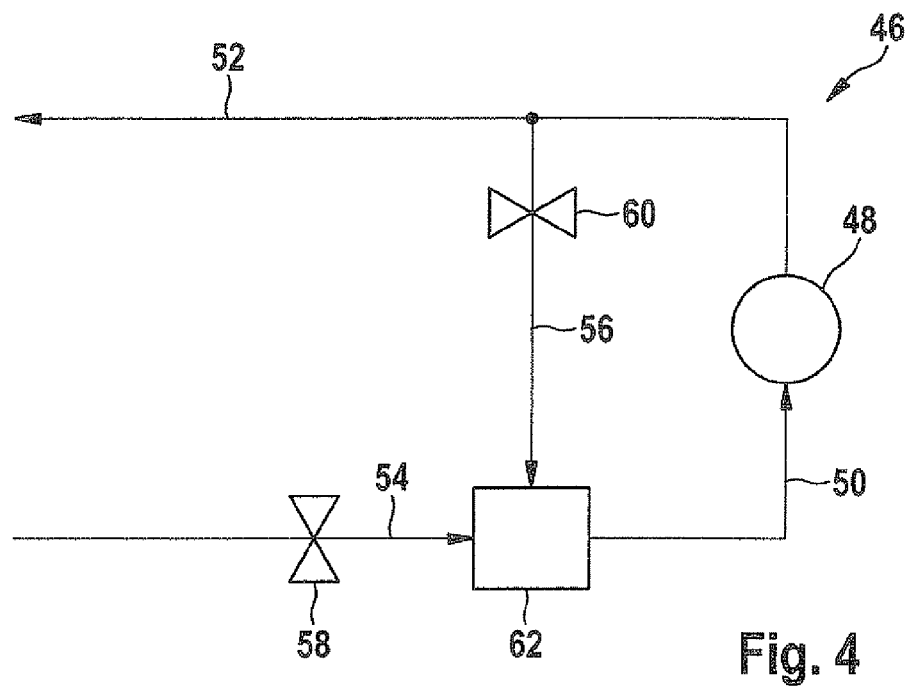
FIG. 4 shows a block diagram to illustrate the air system in an internal combustion engine.

Subsequently, the determination of volumetric efficiency factor 6 is described with reference to FIGS. 4 and 5. Volumetric efficiency factor 6 is measured in air system 46 which is illustrated in FIG. 4 as a block diagram. It supplies a combustion engine 48 with an engine intake gas mass flow 50 and outputs the combusted engine intake gas mass flow in the form of exhaust gas 52. Engine intake gas mass flow 50 is composed of fresh air 54 and a recirculated portion 56 of exhaust gas 52, supplied fresh air 54 being controlled via a throttle valve 58 and recirculated exhaust gas 56 via an exhaust gas recirculation valve 60. Fresh air 54 and recirculated exhaust gas 56 are mixed in a junction 62.

To determine volumetric efficiency factor 6, various sensors are available in air system 46. They allow at least some measured variables to be determined redundantly, thus increasing the information content of the volumetric efficiency factor.

Figure 5:
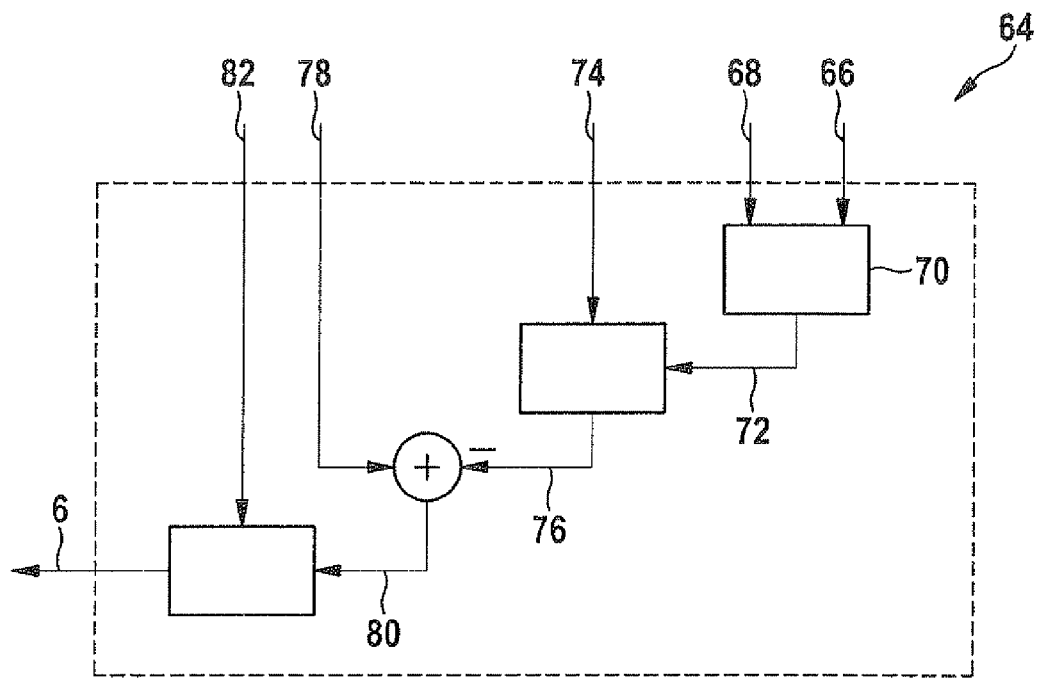
FIG. 5 shows a block diagram to illustrate the calculation of the volumetric efficiency factor in FIG. 1.

FIG. 5 shows calculation function 64 which calculates the volumetric efficiency factor in model 4 of FIG. 1. As shown in FIG. 5, the mass flow through exhaust gas recirculation valve 60, referred to as an EGR mass flow in the following, is initially determined in two different ways. A first EGR mass flow 66 is determined directly at exhaust gas recirculation valve 60. A second EGR mass flow 68 is determined via balancing the mass flow of fresh air 54 and engine intake gas mass flow 50. Theoretically, both EGR mass flows 66, 68 are the same. Practically, however, they deviate from one another due to measuring errors and other inaccuracies in the measuring system. An estimation function 70, which is not described in greater detail in the following, is used to select EGR mass flows 66, 68 having the highest information content. Estimated EGR mass flow 72 is subsequently converted via a thermodynamic approach using measured temperature 74 of EGR mass flow 72 into an enthalpy flow 76 through exhaust gas recirculation valve 60, and it is balanced with enthalpy flow 78 of fresh air 54, thus resulting in an estimated enthalpy flow 80 through combustion engine 48.

Using pressure 82 of fresh air 54, volumetric efficiency factor 6 may finally be determined via another thermodynamic approach.

The exemplary embodiments and/or exemplary methods of the present invention provide for ascertaining errors in a part of an internal combustion engine by the operating state-dependent evaluation of a variable in the part of the internal combustion engine.

What is claimed is:

1. A device for monitoring at least one part of an internal combustion engine based on a variable, the device comprising:
   an observation device, wherein the observation device is configured to:
      detect actual values of the variable during different states of the internal combustion engine, the detected actual values characterizing an actual operation of the at least one part of the internal combustion engine during the different operating states, wherein the variable is a volumetric efficiency factor which indicates how much gas is taken in by the internal combustion engine during a combustion cycle in relation to a theoretically possible gas intake volume; and
      output an actual pattern of the detected actual values;
   a memory to store a reference pattern for a known operation of the internal combustion engine, the reference pattern including reference values of the variable for the different states of the internal combustion engine; and
   an evaluation device to compare the actual pattern to the reference pattern to determine a similarity between the actual operation and the known operation.

2. The device of claim 1, wherein the observation device includes:
   a sensor for detecting a measured variable as a function of the state of the internal combustion engine;
   a modeling unit for outputting a model variable of the internal combustion engine; and
   an arithmetic unit for calculating the actual values of the variable based on the model variable and the measured variable.

3. The device of claim 1, wherein:
   the observation device is configured to assign the actual values to the corresponding operating states in the actual pattern, and the evaluation device is configured to compare the actual pattern to the reference pattern conditional upon that the actual pattern includes at least a predefined minimum number of actual values.

4. The device of claim 1, wherein the reference pattern is a standard pattern whose reference values indicate an error-free operation of the internal combustion engine.

5. The device of claim 1, wherein the reference pattern is an error pattern whose reference values indicate the operation of the internal combustion engine at a known error.

6. The device of claim 1, wherein:
   the reference pattern includes a plurality of reference patters to which the actual pattern is compared, the plurality of reference patterns including a standard pattern having reference values during an error-free operation of the internal combustion engine and at least one error pattern having reference values during operation of the internal combustion engine at a known error; and
   the evaluation device is configured to:
      (i) determine respective extents of difference between the actual pattern and the reference patterns; and
      (ii) output an error signal when the extent of difference between the actual pattern and at least one of the at least one error pattern is less than the extent of difference between the actual pattern and the standard pattern.

7. An air system for supplying an internal combustion engine with gas for a combustion cycle of the internal combustion engine, the air system comprising:
   an observation device, wherein the observation device is configured to:
      detect actual values of a variable during different states of the internal combustion engine, the detected actual values characterizing an actual operation of the internal combustion engine during the different states, wherein the variable is a volumetric efficiency factor which indicates how much gas is taken in by the internal combustion engine during a combustion cycle in relation to a theoretically possible gas intake volume; and
      output an actual pattern of the detected actual values;
   a memory to store a reference pattern for a known operation of the internal combustion engine, the reference pattern including reference values of the variable for the different states of the internal combustion engine; and
an evaluation device to compare the actual pattern to the reference pattern to determine a similarity between the actual operation and the known operation.

\* \* \* \* \*